United States Patent [19]

Locatelli

[11] 4,269,952

[45] May 26, 1981

[54] PREPARATION OF GLYCIDYL POLYARYLETHERS

[75] Inventor: Jean-Louis Locatelli, Vienne, France

[73] Assignee: Rhone-Poulenc Industries, Paris, France

[21] Appl. No.: 109,566

[22] Filed: Jan. 4, 1980

[30] Foreign Application Priority Data

Jan. 5, 1979 [FR] France .............................. 79 00682

[51] Int. Cl.$^3$ .............................................. C08G 59/06
[52] U.S. Cl. .................................... 525/507; 528/40; 528/93; 528/95; 260/348.15
[58] Field of Search .................... 260/348.15; 528/90, 528/93, 95; 525/507

[56] References Cited

U.S. PATENT DOCUMENTS

| | | | |
|---|---|---|---|
| 3,277,051 | 10/1966 | Wynstra | 528/90 |
| 3,306,872 | 2/1967 | Maycock et al. | 528/93 X |

Primary Examiner—Earl A. Nielsen
Attorney, Agent, or Firm—Burns, Doane, Swecker & Mathis

[57] ABSTRACT

Glycidyl polyarylethers are prepared by reacting at least one alkali metal salt of a polyhydric phenol with at least one 1-halo-2,3-epoxyalkane, in an anhydrous and aprotic heterogeneous reaction medium which includes acetonitrile, propionitrile, benzonitrile and/or ethylene sulfide.

23 Claims, No Drawings

PREPARATION OF GLYCIDYL POLYARYLETHERS

BACKGROUND OF THE INVENTION

1. Field of the Invention

The present invention relates to the preparation of glycidyl polyethers by reaction of epoxy compounds, notably the 1-halo-2,3-epoxyalkanes, with the alkali metal salts of polyhydric phenols.

2. Description of the Prior Art

The glycidyl polyethers are commonly denominated "epoxy resins". Such resins constitute a class of thermosetting polymers characterized by the presence of recurring oxirane, i.e.,

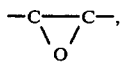

and/or pendant hydroxyl linkages which, after crosslinking, provide systems having a wide variety of different useful properties, useful in a wide variety of different fields, i.e., as coatings, finishes, adhesives, impregnants for electrical components, etc. The immediately aforesaid, moreover, has favored development of such resins along widely diverse lines of application.

Most prominent among the "epoxy" resins is the condensation product of bisphenol A [2,2-bis(4-hydroxyphenol) propane] with epichlorohydrin, a polymer very well known to the art and especially adapted for the coating and electrical fields.

The epoxy resins of bisphenol A/epichlorohydrin type are conveniently and typically prepared by condensing bisphenol A with epichlorohydrin in the presence of water and alkali. Indeed, the prior art is replete with such processes.

For example, U.S. Pat. No. 2,801,227 features a process for the production of glycidyl ether of a polyhydric phenol. This process entails the addition of an aqueous solution of alkali metal hydroxide to an agitated solution of polyhydric phenol in epichlorohydrin, in a proportion of at least 3 moles of epichlorohydrin per phenolic hydroxyl equivalent of the phenol. The water and a portion of the epichlorohydrin are simultaneously distilled from the reaction mixture.

In the process of the aforesaid '227 patent it is essential to control the rate of introduction of the alkali metal hydroxide solution and the rate of distillation, so that the concentration of water in the reaction mixture will be maintained at about 0.3 to 2% by weight of water. The reaction between the epichlorohydrin and the polyhydric phenol takes place at a temperature of the order of 120° C. In practice, the total amount of the alkali metal hydroxide (sodium hydroxide) is added over the course of from 3 to 5 hours. The excess epichlorohydrin is then eliminated by distillation and a solvent is introduced into the reaction mixture so as to separate the resin from the salt (sodium chloride) formed.

Another type of process is based on the principle according to which the alkali plays a dual role in the synthetic scheme: a catalytic role to favor the condensation of the polyhydric phenol with the epichlorohydrin, but also the role of dehydrohalogenation agent, in order to transform the "chlorohydrin" groups into oxirane moieties. Hence, such processes are of two-stage type.

Thus, French Pat. No. 1,336,444 describes such a two-stage process, wherein one mole of bisphenol A and at least 10 moles of epichlorohydrin are contacted at a temperature on the order of 65° C. in a first stage, by progressively or incrementally adding thereto a 50% aqueous solution of sodium hydroxide, over a period of from 2 to 4 hours, with the amount of sodium hydroxide introduced during this period being less than 16% of the total amount required, which amounts to 2 moles of the hydroxide per mole of bisphenol A employed. Subsequently, the water is eliminated by distillation in the form of its azeotrope with epichlorohydrin, and, therefore, only a portion of the excess epichlorohydrin is eliminated from the reaction mixture.

In a second stage, the dehydrochlorination is effected at about 99° C., in the residual epichlorohydrin, by adding the remainder of the sodium hydroxide as the dehydrochlorination agent, in the form of platelets. After about one hour, the excess epichlorohydrin is distilled off.

The resin obtained is subsequently dissolved in a solvent, washed with water and two phases are obtained, an aqueous phase containing the sodium chloride formed and an organic phase containing the resin. The organic phase is separated and is again treated, for about one hour, at approximately 90° C. with particulate sodium hydroxide. The resin is then recovered by means of such various operations as washing, neutralization and drying.

Nonetheless, the aforenoted known processes are extremely difficult to perform: same require relatively long reaction periods, exactingly strict controls over different reaction conditions and numerous stages for the purification and/or recovery of the resin desired. Also, the loss in epichlorohydrin which is necessarily used in excess, is far from negligible, even if the process be carried out with the greatest of care.

Recently, per U.S. Pat. No. 3,519,653, it has been shown that it is possible to prepare intermediates useful in the manufacture of complex epoxy resins, by reacting a suspension of the alkali metal salts of anhydrous dihydroxy phenols, with a large amount of epichlorohydrin. The epichlorohydrin again plays a dual role: it is, on the one hand, a reagent and, on the other, a solvent for the resin formed, thus rendering the reaction mixture more manipulable.

However, this technique, which is undoubtedly of fundamental interest, leads to liquid resins of good quality only with great difficulty. Because the alkali metal salts of dihydroxy phenols are insoluble in epichlorohydrin, the contacting of the two reagents is difficult; the reaction, thus, is relatively slow. The scale-up of such as process to the industrial scale is exceedingly problematical by reason of the large quantities of epichlorohydrin that are necessarily employed and which must be recycled in order not to sacrifice the economy of the process.

In view of the foregoing problems, certain authors, at *Macromol. Chem.*, 179, 7, 1661–1671 (1978), have proposed to effect the synthesis of the resins in question from the alkali metal salts of dihydroxyl phenols and from 1-halo-2,3-epoxyalkanes in an anhydrous, aprotic and homogeneous medium.

These authors have determined that the decisive parameter in said synthesis is the total solubility of the alkali metal salt of the polyphenol in the reaction medium. Because these salts are insoluble in most organic compounds and, in particular, in epichlorohydrin, there was employed, in order to enable working in a homogeneous medium, large amounts of dimethylsulfoxide as the solvent. It was also found that only this compound was suitable for use in the synthesis in question, with the provision that the concentration of the alkali metal salt of the polyhydric phenol did not exceed a limiting value, which was 0.7 mole per dm³ in the case of the disodium salt of bisphenol A, at 80° C. Upon completion of the reaction, the solvent must be eliminated in order to recover the resin, which appears to be difficult from the outset because of the high boiling point of dimethylsulfoxide; furthermore, the risk of degradation of the resin is not negligible. And it too has now been found that the resins produced in this manner have an unacceptable coloration in vis-a-vis their intended use and that their viscosity is generally high. It was also determined that under certain conditions a gel appears. The development of such a process, thus, involves exacting control over the reaction conditions and, in any event, the product resins can be said to be of inadequate quality.

Accordingly, there still exists a great need in this art for an effective, yet facile process for the preparation of glycidyl, phenolic polyethers. Such need is especially felt in the field of the liquid epoxy resins.

SUMMARY OF THE INVENTION

Thus, it is a major object of the present invention to provide for the effective, and yet rapid and facile preparation of glycidyl polyethers, which preparation avoids all of the aforenoted, and notable drawbacks and disadvantages of the prior art, while at the same time enabling synthesis of product resin of extremely high quality, especially a liquid resin, without the necessity of utilizing large amounts of reagents in the process sequence.

Briefly, the present invention features a process for the preparation of glycidyl polyethers of polyhydric phenols by reaction between the alkali metal salts of the polyhydric phenols and the 1-halo-2,3-epoxyalkanes, in an anhydrous and aprotic reaction medium, such process being characterized in that the reaction is conducted in a heterogeneous reaction medium and in the presence of an anhydrous organic compound selected from the group comprising acetonitrile, propionitrile, benzonitrile and ethylene sulfide.

According to the invention, at least one alkali metal salt of a polyhydric phenol is reacted with at least one 1-halo-2,3-epoxyalkane, e.g., the alkali metal salt of bisphenol A is conveniently reacted with epichlorohydrin.

DETAILED DESCRIPTION OF THE INVENTION

By "alkali metal salts of the polyhydric phenols", there are intended compounds of the formula $R(OM)_x$, wherein x is a number greater than or equal to 2, representing the number of phenolic, or nuclear hydroxyl groups contained in the polyhydric phenol molecule, M represents a lithium, sodium, potassium or cesium atom, with M preferably being a sodium or potassium atom, and R represents the dehydroxylated residue of the polyhydric phenol.

The alkali metal salts of the broad spectrum of the polyhydric phenols are within the ambit of the invention. Representative are:
1,2-dihydroxybenzene
1,3-dihydroxybenzene
1,4-dihydroxybenzene
1-2-dihydroxy-4-chlorobenzene
1,2-dihydroxy-4-bromobenzene
1,2-dihydroxy-3-methylbenzene
1,3-dihydroxy-5-chlorobenzene
1,3-dihydroxy-5-bromobenzene
1,3-dihydroxy-2-methylbenzene
1,4-dihydroxy-2-chlorobenzene
1,2,3-trihydroxybenzene
1,2,4-trihydroxybenzene
1,2,5-trihydroxybenzene
1,3,5-trihydroxybenzene
1,2-dihydroxynaphthalene
1,4-dihydroxynaphthalene
1,5-dihydroxynaphthalene
2,3-dihydroxynaphthalene
1,2-dihydroxyanthracene
1,2,9-trihydroxyanthracene
1,4,9-trihydroxyanthracene
1,2,10-trihydroxyanthracene
4,4'-dihydroxydiphenyl
4,4'-dihydroxydiphenylsulfone
2,3-dihydroxydiphenylsulfone
2,4,2',4'-tetrahydroxydiphenyl
2,4,2',5'-tetrahydroxydiphenyl
2,5-dihydroxydiphenylmethane
4,4'-dihydroxydiphenylmethane [Bisphenol F]
1,1-bis(4-hydroxyphenyl)ethane
1,1-bis(4-hydroxyphenyl)isobutane
2,2-bis(4-hydroxyphenyl)propane [Bisphenol A]
2,2-bis(4-hydroxyphenyl)butane
2,2-bis(4-hydroxy-2-methylphenyl)propane
2,2-bis(2-hydroxy-4-tertbutylphenyl)propane
2,2-bis(2-hydroxyphenyl)propane
2,4'-dihydroxydiphenyldimethylmethane
2,2-bis(2-chloro-4-hydroxyphenyl)propane
2,2-bis(4-hydroxyphenyl)-1,1,1-trichloroethane
2,2-bis(4-hydroxyphenyl)-1,1-dichloroethylene
tris(4-hydroxyphenyl)methane
2,2,3,3-tetrakis(4'-hydroxyphenyl)butane
2,2,4,4-tetrakis(4'-hydroxyphenyl)pentane
2,2,5,5-tetrakis(4'-hydroxyphenyl)hexane
1,1,2,2-(p-hydroxyphenyl)ethane
2,2-bis(3,5-dibromo-4-hydroxyphenyl)propane The present invention also envisages the use of the alkali metal salts of the more complex polyhydric phenols, such as the novolak resins obtained, for example, by condensation in the presence of acid catalysts, of phenol, p-cresol or other substituted phenols and of aldehydes such as formaldehyde, acetaldehyde, crotonaldehyde, etc.

The process according to the invention is applicable to the alkali metal salts of those polyhydric phenols comprising at least two phenolic hydroxyl groups per molecule and which do not contain any additional functional groups capable of interfering with the formation of the desired glycidyl ether recurring unit, or which would otherwise lead to undesirable, competing side reactions.

Also according to the present invention, mixtures of two or more of the alkali metal salts of the polyhydric phenols may be used, i.e., a mixture of two or more different compounds, differing in the nature of the alkali metal cation and/or deriving from two or more different polyhydric phenols.

According to a preferred embodiment of the present invention, an alkali metal salt of a diphenol, or a mixture of two or more alkali metal salts of diphenols, which may differ in the nature of the alkali metal cation and/or deriving from two or more different diphenols, is utilized. Preferably, sodium or potassium salts of one or more diphenols, in particular salts of diphenols selected from the group comprising 1,2-dihydroxybenzene, 1,4-dihydroxybenzene, bisphenol A, bisphenol F, 2,2-bis(4-hydroxyphenyl)-1,1-dichloroethylene and 2,2-bis(3,5-dibromo-4-hydroxyphenyl)propane, are employed.

According to another preferred embodiment of the invention, the alkali metal salts of bisphenol A and/or bisphenol F, and more particularly the sodium or potassium salts, are used.

The sodium salts of bisphenol A and/or bisphenol F are more preferably utilized in the process of the invention; most preferably, the sodium salt of bisphenol A is employed.

Any one of a great number of the 1-halo-2,3-epoxyalkanes, typically the lower alkanes, are applicable to the process of the invention. Exemplary are: 1-chloro-2,3-epoxypropane [epichlorohydrin], 1-bromo-2,3-epoxypropane, 1-chloro-2,3-epoxybutane, 1-chloro-2-methyl-2,3-epoxypropane, and admixtures thereof.

Preferably, epichlorohydrin is used. Because the reaction medium must be anhydrous, it is advisable to dry the reagent, if necessary.

According to the present invention, at least one mole of 1-halo-2,3-epoxyalkane per gram equivalent of OM groups deriving from the at least one compound of the formula $R(OM)_x$, (R, M and x being as defined hereinabove) starting material, is reacted in an anhydrous aprotic and heterogeneous medium. There is no particular advantage in conducting the reaction with more than 13 moles of 1-halo-2,3-epoxyalkane per gram equivalent of OM groups. Preferably, 1 to 5 moles of 1-halo-2,3-epoxyalkane per gram equivalent of OM groups are utilized and, more preferably, 1 to 3 moles of 1-halo-2,3-epoxyalkane per gram equivalent of OM groups are employed.

Because the compounds of the aforenoted formula $R(OH)_x$ are insoluble in the reaction medium, it is desirable for most satisfactory results according to the present invention to conduct the process under adequate agitation or stirring.

It has surprisingly been found that the presence in the reaction medium of an anhydrous compound selected from the group comprising acetonitrile, propionitrile, benzonitrile and ethylene sulfide has an unexpected beneficial effect on the rate of the reaction and gives rise to the production of resins of most satisfactory quality, while at the same time the reaction medium remains heterogeneous.

In general, a quantity of the anhydrous and polar organic compound on the order of 10% by weight is added to the reaction medium. This quantity represents, preferably, at least 30% by weight of the reaction medium. Larger amounts may be used, but beyond 80% by weight, no particular advantage is observed. According to one advantageous embodiment of the invention, between 10 to 80% by weight of acetonitrile, and preferably less than 30% by weight of acetonitrile is used. The temperature of the reaction is not critical and is generally between 50° and 150° C. Below 50° C. the reaction is relatively slow and above 150° C. there is a risk of degradation of the resin obtained. Preferably, a temperature between about 80° and 120° C. is used. The process may be effected under atmospheric pressure, or a nitrogen pressure of up to 20 bars may be applied.

The process according to the invention also enables recovery of the product resin upon completion of the reaction by relatively simple and rapid means. For example, the mixture obtained, containing the desired resin, the alkali metal halide formed during the reaction, the polar organic compound initially introduced and, possibly, unreacted 1-halo-2,3-epoxyalkane, may simply be filtered.

Subsequently, the filtrate containing the resin may be distilled, optionally under vacuum, to eliminate the 1-halo-2,3-epoxyalkane that has not reacted and the polar, organic compound.

The process according to the invention is especially well adapted for the preparation of liquid epoxy resins from epichlorohydrin and the alkali metal salts of bisphenol A and/or bisphenol F and, more particularly, from the disodium salt of bisphenol A.

In order to further illustrate the present invention and the advantages thereof, the following specific examples are given, it being understood that same are intended only as illustrative and in nowise limitative.

EXAMPLE 1

Preparation of disodium salt of bisphenol A

Into a solution of 40 g sodium hydroxide and 200 cm$^3$ methanol, there was poured a solution of 114 g bisphenol A and 144 cm$^3$ methanol. The mixture was heated under reflux for 30 minutes and then 70% of the methanol was distilled off.

To the remaining paste, 234 cm$^3$ of toluene were added. The methanol-toluene azeotrope was distilled off, followed by the distillation of the water-toluene azeotrope. The operation was discontinued when only the toluene continued to distil. The disodium salt of bisphenol A (designated in the examples hereinafter as "sodium bisphenate") was filtered and dried in an oven under 20 mm Hg at 90° C., for 16 hours. The product obtained in this manner was used in the preparation of the resins as described hereinafter.

CONTROL EXPERIMENT (A)

Into a glass reactor equipped with an anchored central agitator, a bulb condenser and a thermometer, the following were charged, at 60° C.:
46.25 g (0.5 mole) epichlorohydrin, and
3.3 g sodium bisphenate, anhydrous (first fraction).

The reaction medium was heated to 117° C. (epichlorohydrin reflux) and subsequently, every 20 minutes, in eight separate additions, a fraction of 3.3 g anhydrous sodium bisphenate was introduced. Overall, 29.6 g (0.1 mole) of anhydrous sodium bisphenate was introduced in nine equal fractions. The reaction medium had the appearance of a suspension; the operation had a total duration of 3 hours, 20 minutes.

After cooling, the solid phase was separated by filtration and then the filtrate was evaporated under reduced pressure (20 mm Hg) and heated to 140° C.

In this manner, 23 g of liquid resin having the following characteristics were obtained:
viscosity at 25° C.=1000 poises
epoxy content per 100 g=0.430

CONTROL EXPERIMENT (B)

The above operation was repeated, but by charging:
92.5 g (1 mole) epichlorohydrin, and
27.75 g (0.1 mole) sodium bisphenate, anhydrous, introduced as nine equal fractions of 3.1 g each, with one fraction being introduced every 20 minutes.

27 g of a liquid resin having the following characteristics were obtained:
viscosity at 25° C. = 190 poises
epoxy content per 100 g = 0.488
chlorine content = 0.78%

CONTROL EXPERIMENT (C)

The operation described under Experiment (b) was repeated, but by introducing the anhydrous sodium bisphenate in 18 different fractions of 1.54 g each, one being introduced every 20 minutes, the duration of the operation being 6 hours. 29 g of liquid resin having the following characteristics were obtained:
viscosity at 25° C. = 430 poises
epoxy content per 100 g = 0.470

CONTROL EXPERIMENT (D)

Into a glass reactor equipped with an anchored agitator, a thermometer and a distillation column with condenser and receiver, 100 g dimethylsulfoxide and 80 cm$^3$ toluene were charged. The mixture was heated to 163° C. so as to eliminate all of the water present in the dimethylsulfoxide, in the form of the water/toluene azeotrope.

65 cm$^3$ of the distillate were recovered. After cooling to 100° C., the column was replaced by a bulb condenser.

46.25 g (0.5 mole) epichlorohydrin were charged and a total of 28.2 g (0.1 mole) sodium bisphenate were introduced in six fractions of 4.7 g each, every 10 minutes, while maintaining the temperature at 100° C., with the duration of the reaction being one hour from the introduction of the first fraction of the sodium bisphenate. (The fractional introduction of the sodium bisphenate avoids the gelling of the reaction medium, which is a phenomenon which has been observed during the course of numerous tests effected with the total amount of the sodium bisphenate all being charged at the beginning). The suspension obtained in this manner was filtered and the filter cake washed with 20 cm$^3$ dimethylsulfoxide. The filtrate was evaporated by heating to 150° C. under a pressure of 1 mm Hg. In this manner, 33.8 g of a resin having the following characteristics were obtained:
viscosity at 25° C. = 210 poises
epoxy content per 100 g = 0.491
chlorine content = 1.8%
coloration: ≧18 Gardner

EXAMPLE 2

Into the apparatus described in above Experiment (a), the following were charged:
92 g (1 mole) epichlorohydrin, and
78 cm$^3$ acetonitrile The mixture was heated to 60° C. and 54.5 g (0.2 mole) of anhydrous sodium bisphenate were added. A suspension was obtained. The mixture was heated to 83° C. (acetonitrile reflux) over the course of one hour, and the suspension was then filtered. The filtrate was evaporated under reduced pressure (20 mm Hg) and by heating to 140° C. The mixture was then cooled. 11.5 g of a liquid resin having the following characteristics were obtained:
viscosity at 25° C. = 100 poises
epoxy content per 100 g = 0.525
coloration: <10 Gardner

EXAMPLE 3

Into the above-described apparatus, the following were charged:
185 g (2 moles) epichlorohydrin, and
156 cm$^3$ acetonitrile The mixture was heated to 60° C. and 109 g (0.4 mole) anhydrous sodium bisphenate (98% pure) were added. The mixture was heated to 85° C. over the course of 2 hours, 30 minutes. The suspension obtained was filtered. The filter cake was washed twice with 50 cm$^3$ acetonitrile. The filtrate was evaporated at 80° C. under 20 mm Hg, then heated to 140° C. for 15 minutes under 15 mm Hg.

In this manner, 58 g of liquid resin having the following characteristics were obtained:
viscosity at 25° C. = 109 poise
epoxy content per 100 g = 0.536
chlorine content = 0.41%
coloration: <10 Gardner

EXAMPLE 4

The operation of Example 3 was repeated, but by charging 115 cm$^3$ acetonitrile.

70.8 g of a liquid resin having the following characteristics were obtained:
viscosity at 25° C. = 148 poises
epoxy content per 100 g = 0.532
chlorine content <0.40%

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the preparation of a glycidyl polyarylether comprising reacting at least one alkali metal salt of a polyhydric phenol with at least one 1-halo-2,3-epoxyalkane, in an anhydrous and aprotic reaction medium, the improvement which comprises said reaction medium being heterogeneous and including an organic compound selected from the group comprising acetonitrile, propionitrile, benzonitrile and ethylene sulfide.

2. The process as defined in claim 1, wherein the alkali metal cation is selected from the group consisting of sodium, potassium, lithium, cesium, and mixtures thereof.

3. The process as defined by claim 2, wherein said cation is sodium or potassium.

4. The process as defined by claim 3, wherein said cation is sodium.

5. The process as defined by claim 1, wherein said polyhydric phenol is a diphenol.

6. The process as defined by claim 1, wherein said polyhydric phenol is selected from the group consisting of 1,2-dihydroxybenzene, 1,3-dihydroxybenzene, 1,4-dihydroxybenzene, 1-2-dihydroxy-4-chlorobenzene, 1,2-dihydroxy-4-bromobenzene, 1,2-dihydroxy-3-methylbenzene, 1,3-dihydroxy-5-chlorobenzene, 1,3-dihydroxy-5-bromobenzene, 1,3-dihydroxy-2-methylbenzene, 1,4-dihydroxy-2-chlorobenzene, 1,2,3-trihydroxybenzene, 1,2,4-trihydroxybenzene, 1,2,5-trihydroxybenzene, 1,3,5-trihydroxybenzene, 1,2-dihydroxynaphthalene, 1,4-dihydroxynaphthalene, 1,5-dihydroxynaphthalene, 2,3-dihydroxynaphthalene, 1,2-dihydroxyanthracene, 1,2,9-trihydroxyanthracene, 1,4,9-trihydroxyanthracene, 1,2,10-trihydroxyanthracene, 4,4'-dihydroxydiphenyl, 4,4'-dihydroxydiphenylsulfone, 2,3-dihydroxydiphenylsulfone, 2,4,2',4'-tetrahydroxydiphenyl, 2,4,2',5'-tetrahydroxydiphenyl, 2,5-dihydroxydiphenylmethane, 4,4'-dihydroxydiphenylmethane, 1,1-bis(4-hydroxyphenyl)ethane, 1,1-bis(4-hydroxyphenyl)isobutane, 2,2-bis(4-hydroxyphenyl)propane, 2,2-bis)4-hydroxyphenyl)butane, 2,2-bis(4-hydroxy-2-methylphenyl)propane, 2,2-bis(2-hydroxy-4-tertbutylphenyl)propane, 2,2-bis(2-hydroxyphenyl)propane, 2,4'-dihydroxydiphenyldimethylmethane, 2,2-bis(2-chloro-4-hydroxyphenyl)propane, 2,2-bis(4-hydroxyphenyl)-1,1,1-trichloroethane, 2,2-bis(4-hydroxyphenyl)-1,1-dichloroethylene, tris(4-hydroxyphenyl)methane, 2,2,3,3-tetrakis(4'-hydroxyphenyl)butane, 2,2,4,4-tetrakis(4'-hydroxyphenyl)pentane, 2,2,5,5-tetrakis(4'-hydroxyphenyl)hexane, 1,1,2,2-tetrakis(p-hydroxyphenyl)ethane, and 2,2-bis(3,5-dibromo-4-hydroxyphenyl)propane.

7. The process as defined by claim 1, wherein said polyhydric phenol is a novolak resin.

8. The process as defined by claim 1, wherein said polyhydric phenol is selected from the group consisting of 1,2-dihydroxybenzene, 1,4-dihydroxybenzene, bisphenol A, bisphenol F, 2,2-bis(4-hydroxyphenyl)-1,1-dichloroethylene, and 2,2-bis(3,5-dibromo-4-hydroxyphenyl)propane.

9. The process as defined by claim 8, wherein said polyhydric phenol is bisphenol A, bisphenol F, or mixtures thereof.

10. The process as defined by claim 9, wherein said polyhydric phenol is bisphenol A.

11. The process as defined by any of claims 1, 6 or 8, wherein said 1-halo-2,3-epoxyalkane is selected from the group consisting of 1-chloro-2,3-epoxypropane, 1-bromo-2,3-epoxypropane, 1-chloro-2,3-epoxybutane, 1-chloro-2-methyl-2,3-epoxypropane, and mixtures thereof.

12. The process as defined by claim 11, wherein said 1-halo-2,3-epoxyalkane is epichlorohydrin.

13. The process as defined by claim 1, wherein the reaction is conducted in the presence of 1 to 13 moles of 1-halo-2,3-epoxyalkane per gram equivalent of —OM groups comprising the polyhydric phenol, with M being the alkali metal cation.

14. The process as defined by claim 13, there being present 1 to 5 moles of the 1-halo-2,3-epoxyalkane.

15. The process as defined by claim 1, the organic compound being anhydrous acetonitrile.

16. The process as defined by claim 1, the organic compound being anhydrous propionitrile.

17. The process as defined by claim 1, the organic compound being anhydrous benzonitrile.

18. The process as defined by claim 1, the organic compound being anhydrous ethylene sulfide.

19. The process as defined by claim 1, the organic compound comprising from 10 to 80% by weight of the reaction medium.

20. The process as defined by claim 1, the organic compound comprising at least 30% by weight of the reaction medium.

21. The process as defined by claim 1, the reaction being conducted at a temperature of from 50° to 150° C.

22. The process as defined by claim 1, comprising reacting the disodium salt of bisphenol A with epichlorohydrin, at the rate of 2 to 10 moles of epichlorohydrin per mole of the bisphenol A salt, in a reaction medium including 30 to 80% by weight acetonitrile, and at a temperature of from 80° to 120° C.

23. The process as defined by claim 1, further comprising filtering the mixture of reaction to remove the alkali metal halide formed during the course of the reaction, distilling the filtrate to remove unreacted 1-halo-2,3-epoxyalkane and the organic compound comprising the reaction mixture, and recovering the product glycidyl polyarylether.

* * * * *